United States Patent
Feng (10) Patent No.: US 11,582,506 B2
(45) Date of Patent: Feb. 14, 2023

(54) VIDEO PROCESSING METHOD AND APPARATUS, AND STORAGE MEDIUM

(71) Applicant: ZTE CORPORATION, Guangdong (CN)

(72) Inventor: Bin Feng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 260 days.

(21) Appl. No.: 16/627,923

(22) PCT Filed: Aug. 17, 2018

(86) PCT No.: PCT/CN2018/100979
§ 371 (c)(1),
(2) Date: Dec. 31, 2019

(87) PCT Pub. No.: WO2019/052306
PCT Pub. Date: Mar. 21, 2019

(65) Prior Publication Data
US 2021/0152876 A1 May 20, 2021

(30) Foreign Application Priority Data
Sep. 14, 2017 (CN) .......................... 201710829230.2

(51) Int. Cl.
*H04N 21/43* (2011.01)
*H04N 21/4223* (2011.01)
(Continued)

(52) U.S. Cl.
CPC ......... *H04N 21/4312* (2013.01); *G06F 3/013* (2013.01); *H04N 21/4223* (2013.01); *H04N 21/482* (2013.01)

(58) Field of Classification Search
CPC .................................................... H04N 21/20
See application file for complete search history.

(56) References Cited

U.S. PATENT DOCUMENTS 8,112,777 B2 * 2/2012 Kim .................... H04N 21/4334
725/54
9,767,613 B1 * 9/2017 Bedikian ............. G06F 3/04845
(Continued)

FOREIGN PATENT DOCUMENTS

CN 101902652 A 12/2010
CN 102332001 1/2012
(Continued)

OTHER PUBLICATIONS

Korean Office Action issue in application No. 10-2020-7000333 dated Aug. 25, 2020.
(Continued)

*Primary Examiner* — Mushfikh I Alam
(74) *Attorney, Agent, or Firm* — Knobbe, Martens, Olson & Bear, LLP (57) ABSTRACT

Disclosed are a video processing method and apparatus, and a storage medium. The method includes: receiving a selection instruction of having selected one or more video streams or key frames of the one or more video streams to be browsed; setting video stream thumbnails generated from the one or more video streams or key frame thumbnails generated from the key frames to a scene thumbnail to generate a picture layout stream according to the selection instruction, where the scene thumbnail is generated according to a scene displayed in an augmented reality/virtual reality (AR/VR) interface; and presenting the picture layout stream in the VR/AR interface, and providing a virtual layout interface of multiple video stream pictures.

14 Claims, 9 Drawing Sheets

(51) Int. Cl.
*H04N 21/431* (2011.01)
*G06F 3/01* (2006.01)
*H04N 21/482* (2011.01)

(56) References Cited

U.S. PATENT DOCUMENTS

| | | | |
|---|---|---|---|
| 10,600,153 B2* | 3/2020 | Roimela | G06F 3/012 |
| 10,905,943 B2* | 2/2021 | Perry | A63F 13/211 |
| 2003/0197785 A1 | 10/2003 | White et al. | |
| 2009/0207316 A1 | 8/2009 | Cupal et al. | |
| 2010/0302130 A1* | 12/2010 | Kikuchi | G06F 3/1454 |
| | | | 345/1.3 |
| 2011/0013882 A1* | 1/2011 | Kusunoki | G11B 27/28 |
| | | | 386/241 |
| 2013/0263056 A1* | 10/2013 | Son | G06F 3/04842 |
| | | | 715/838 |
| 2013/0342731 A1* | 12/2013 | Lee | H04N 5/232127 |
| | | | 348/231.4 |
| 2014/0118625 A1 | 5/2014 | Cho | |
| 2015/0206349 A1* | 7/2015 | Rosenthal | G06T 19/006 |
| | | | 345/633 |
| 2015/0221345 A1* | 8/2015 | Zhao | H04N 21/85406 |
| | | | 386/241 |
| 2015/0301596 A1* | 10/2015 | Qian | G06F 3/013 |
| | | | 345/633 |
| 2015/0363076 A1* | 12/2015 | Komatsu | G06V 20/64 |
| | | | 715/765 |
| 2016/0180589 A1 | 6/2016 | Bean et al. | |
| 2016/0267716 A1* | 9/2016 | Patel | G06T 19/20 |
| 2017/0185147 A1* | 6/2017 | Shen | G02B 30/34 |
| 2018/0081178 A1* | 3/2018 | Shpunt | H04N 13/38 |
| 2018/0081448 A1* | 3/2018 | Woo | G06F 3/017 |
| 2018/0275410 A1* | 9/2018 | Yeoh | H04N 13/398 |
| 2018/0376217 A1* | 12/2018 | Kahng | H04N 21/23439 |
| 2019/0065026 A1* | 2/2019 | Kiemele | G02B 27/0172 |
| 2019/0094957 A1* | 3/2019 | Nelson | G06F 3/03547 |
| 2019/0220953 A1* | 7/2019 | Zhou | H04N 21/8547 |
| 2019/0355153 A1* | 11/2019 | Singh | H04N 21/8541 |
| 2019/0368868 A1* | 12/2019 | Abovitz | G02B 27/4205 |

FOREIGN PATENT DOCUMENTS

| | | |
|---|---|---|
| CN | 102364960 A | 2/2012 |
| CN | 103299645 A | 9/2013 |
| CN | 103369128 A | 10/2013 |
| CN | 104378578 | 2/2015 |
| CN | 105898342 A | 8/2016 |
| CN | 106534963 | 3/2017 |
| CN | 106713964 | 5/2017 |
| CN | 106937531 A | 7/2017 |
| CN | 107018386 A | 8/2017 |
| CN | 107040794 A | 8/2017 |
| CN | 107147882 A | 9/2017 |
| JP | 2010-278824 A | 12/2010 |
| JP | 2011-217098 A | 10/2011 |
| JP | 2015-076875 A | 4/2015 |
| JP | 2017-511615 A | 4/2017 |
| KR | 2013-0112162 A | 10/2013 |
| WO | WO 2016/103115 A1 | 6/2016 |

OTHER PUBLICATIONS

Supplementary European Search Report for EP 18855912 dated Dec. 17, 2020.
International Search Report of Application No. PCT/CN2018/100979—4 pages (dated Nov. 7, 2018).
Japanese Office Action dated Nov. 12, 2021 for Japanese Patent Application No. 2019-572744. 12 pages.
Chinese Supplemental Search Report dated Dec. 21, 2021 for Chinese Patent Application No. 2017108292302. 4 pages.
Chinese Office Action dated Dec. 30, 2021 for Chinese Patent Application No. 201710829230.2. 16 pages.
First Office Action for JP 2019-572744.
Second Office Action for KR 10-2020-7000333.
Third Office Action for KR 10-2020-7000333.
First Search Report for CN 201710829230.2.
First Office Action for CN 201710829230.2.

* cited by examiner

VIDEO PROCESSING METHOD AND APPARATUS, AND STORAGE MEDIUM

CROSS-REFERENCES TO RELATED APPLICATIONS

This is a U.S. National Stage Application, filed under 35 U.S.C. 371, of International Patent Application No. PCT/CN2018/100979 filed on Aug. 17, 2018, which claims priority to No. 201710829230.2 filed on Sep. 14, 2017, contents of both of which are incorporated herein by reference in their entireties.

TECHNICAL FIELD

The present disclosure relates to the field of communications and, in particular, relates to a video processing method and apparatus, and a storage medium.

BACKGROUND

Traditional video application systems for video conferences or monitoring and the like are limited by the resolution and size of a display screen, the physical space of a conference room, the system cost and the like, and merely two or three video stream pictures can be achieved at the same time. If the system needs to support more video streams, either a screen with very large resolution and size or multiple display screens are required, or the picture needs to be shrunk so that multiple video streams can be displayed at the same time. The cost of the former is high, the definition of the latter is low, and neither the former nor the latter can make users browse videos flexibly and conveniently.

For the problem that users cannot browse videos flexibly and conveniently in the related art, no solution has been proposed.

SUMMARY

Embodiments of the present disclosure provide a video processing method and apparatus and a storage medium, to at least solve the problem in the related art that users cannot browse videos flexibly and conveniently.

According to an embodiment of the present disclosure, a video processing method is provided, and the method includes the following steps.

A selection instruction of having selected one or more video streams or key frames of the one or more video streams to be browsed is received, where the one or more video streams come from one or more terminals.

Video stream thumbnails generated from the one or more video streams or key frame thumbnails generated from the key frames are set to a scene thumbnail to generate a picture layout stream according to the selection instruction, where the scene thumbnail is generated according to a scene displayed in an augmented reality/virtual reality (AR/VR) interface.

The picture layout stream is presented in the VR/AR interface.

In an embodiment, before a selection instruction of having selected one or more video streams or key frames of the one or more video streams to be browsed is received, the method further includes: generating the video stream thumbnails according to the one or more video streams, where one video stream thumbnail is generated from one video stream; or acquiring the key frames of the one or more video streams, and generating the key frame thumbnails according to the key frames of the one or more video streams, where one key frame thumbnail is generated from key frames of the one video stream.

In an embodiment, the step of acquiring the key frames of the one or more video streams includes: acquiring the key frames of the one or more video streams from a key frame queue preset in a network device, where the key frames of the one or more video streams are key frames generated and saved by the network device according to collected codeword information and quantization parameter information during a process of decoding the one or more video streams.

In an embodiment, before the video stream thumbnails generated from the one or more video streams or key frame thumbnails generated from the key frames are set to the scene thumbnail to generate the picture layout stream according to the selection instruction, the method further includes: receiving a chosen instruction of having selected the scene thumbnail; and enlarging the scene thumbnail by a predetermined multiple according to the chosen instruction, and displaying the enlarged scene thumbnail in the AR/VR interface.

In an embodiment, the step of setting video stream thumbnails generated from the one or more video streams or key frame thumbnails generated from the key frames to the scene thumbnail to generate the picture layout stream according to the selection instruction includes: adjusting sizes of the video stream thumbnails or sizes of the key frame thumbnails according to the selection instruction; selecting a type of a virtual television, and rendering the virtual television into the scene thumbnail; and rendering the one or more video streams and the virtual television to the AR/VR interface according to coordinates of the scene thumbnail in the AR/VR interface, and updating the scene thumbnail.

In an embodiment, before the video stream thumbnails generated from the one or more video streams or key frame thumbnails generated from the key frames are set to the scene thumbnail to generate the picture layout stream according to the selection instruction, the method further includes: capturing a virtual box formed by a gesture in a predetermined direction through an AR/VR camera; obtaining coordinates and a size of the virtual box in the AR/VR interface through calculation; and rendering the virtual television indicated by the virtual box in the AR/VR interface.

In an embodiment, the method further includes: receiving a current gaze direction of a user and layout information of a real-time picture which are fed back by the AR/VR camera; and adjusting, according to the layout information, at least one of the following parameters of each of the one or more video streams: resolution, frame rate, or code rate.

According to another embodiment of the present disclosure, a video processing apparatus is further provided, is applied to an AR/VR device, and includes a first receiving module, a first generating module and a presenting module.

The first receiving module is configured to receive a selection instruction of having selected one or more video streams or key frames of the one or more video streams to be browsed, where the one or more video streams come from one or more terminals.

The first generating module is configured to set video stream thumbnails generated from the one or more video streams or key frame thumbnails generated from the key frames to a scene thumbnail to generate a picture layout stream according to the selection instruction, where the scene thumbnail is generated according to a scene displayed in an AR/VR interface.

The presenting module is configured to present the picture layout stream in the VR/AR interface.

In an embodiment, the apparatus further includes a second generating module and an acquiring module.

The second generating module is configured to generate the video stream thumbnails according to the one or more video streams, where one video stream thumbnail is generated from one video stream.

The acquiring module is configured to acquire the key frames of the one or more video streams, and generate the key frame thumbnails according to the key frames of the one or more video streams, where one key frame thumbnail is generated from key frames of the one video stream.

In an embodiment, the acquiring module is further configured to acquire the key frames of the one or more video streams from a key frame queue preset in a network device, where the key frames of the one or more video streams are key frames generated and saved by the network device according to collected codeword information and quantization parameter information during a process of decoding the one or more video streams.

In an embodiment, the apparatus further includes a second receiving module and an enlarging module.

The second receiving module is configured to receive a chosen instruction of having selected the scene thumbnail.

The enlarging module is configured to enlarge the scene thumbnail by a predetermined multiple according to the chosen instruction, and display the enlarged scene thumbnail in the AR/VR interface.

In an embodiment, the first generating module is further configured to adjust sizes of the video stream thumbnails or sizes of the key frame thumbnails according to the selection instruction; select a type of a virtual television, and render the virtual television into the scene thumbnail; and render the one or more video streams and the virtual television to the AR/VR interface according to coordinates of the scene thumbnail in the AR/VR interface, and update the scene thumbnail.

In an embodiment, the apparatus further includes a capturing module, a calculation module and a rendering module.

The capturing module is configured to capture a virtual box formed by a gesture in a predetermined direction through an AR/VR camera.

The calculation module is configured to obtain coordinates and a size of the virtual box in the AR/VR interface through calculation.

The rendering module is configured to render the virtual television indicated by the virtual box in the AR/VR interface.

In an embodiment, the apparatus further includes a third receiving module and an adjusting module.

The third receiving module is configured to receive a current gaze direction of a user and layout information of a real-time picture which are fed back by the AR/VR camera.

The adjusting module is configured to adjust, according to the layout information, at least one of the following parameters of each of the one or more video streams: resolution, frame rate, or code rate.

Another embodiment of the present disclosure further provides a storage medium including stored programs which, when executed, perform the method according to any one of the embodiments described above.

Another embodiment of the present disclosure further provides a processor, which is configured to execute programs which, when executed, perform the method according to any one of the embodiments described above.

According to the embodiments of the present disclosure, a selection instruction of having selected one or more video streams or key frames of the one or more video streams to be browsed is received; video stream thumbnails generated from the one or more video streams or key frame thumbnails generated from the key frames are set to a scene thumbnail to generate a picture layout stream according to the selection instruction, where the scene thumbnail is generated according to a scene displayed in an AR/VR interface; the picture layout stream is presented in the VR/AR interface. A virtual layout interface of multiple video stream pictures is provided, so that the problem in the related art that users cannot browse videos flexibly and conveniently is solved, and the user can operate the multiple video stream pictures in the entire layout interface through handle or gesture control.

BRIEF DESCRIPTION OF DRAWINGS

The drawings described herein are used to provide a further understanding of the present disclosure and form a part of the present application. The exemplary embodiments and descriptions thereof in the present disclosure are used to explain the present disclosure and not to limit the present disclosure in any improper way. In the drawings.

DETAILED DESCRIPTION

The present disclosure will be described hereinafter in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment 1

Figure 1:
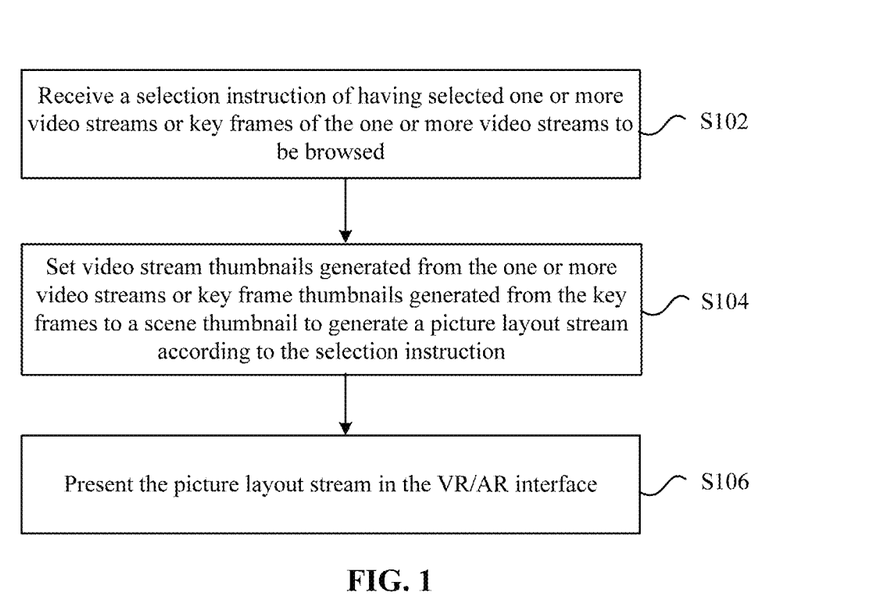
FIG. 1 is a flowchart of a video processing method according to an embodiment of the present disclosure.

The embodiment provides a video processing method running on a network device. FIG. 1 is a flowchart of a video processing method according to an embodiment of the present disclosure.

As shown in FIG. 1, the process includes the steps described below.

In step S102, a selection instruction of having selected one or more video streams or key frames of the one or more video streams to be browsed is received, where the one or more video streams come from one or more terminals.

In step S104, video stream thumbnails generated from the one or more video streams or key frame thumbnails generated from the key frames are set to a scene thumbnail to generate a picture layout stream according to the selection instruction, where the scene thumbnail is generated according to a scene displayed in an AR/VR interface.

In step S106, the picture layout stream is presented in the VR/AR interface.

According to the above steps, a selection instruction of having selected one or more video streams or key frames of the one or more video streams to be browsed is received; video stream thumbnails generated from the one or more video streams or key frame thumbnails generated from the key frames are set to a scene thumbnail to generate a picture layout stream according to the selection instruction, where the scene thumbnail is generated according to a scene displayed in an augmented reality/virtual reality (AR/VR) interface; the picture layout stream is presented in the VR/AR interface. A virtual layout interface of multiple video stream pictures is provided, so that the problem in the related art that users cannot browse videos flexibly and conveniently is solved, and the user can operate the pictures of multiple video streams in the entire layout interface through handle or gesture control.

In an embodiment, before a selection instruction of having selected one or more video streams or key frames of the one or more video streams to be browsed is received, the method further includes the following steps.

The video stream thumbnails are generated according to the one or more video streams, where one video stream thumbnail is generated from one video stream.

The key frames of the one or more video streams are acquired, and the key frame thumbnails are generated according to the key frames of the one or more video streams, where one key frame thumbnail is generated from key frames of the one video stream.

In an embodiment, the step of acquiring the key frames of the one or more video streams includes: acquiring the key frames of the one or more video streams from a key frame queue preset in a network device, where the key frames of the one or more video streams are key frames generated and saved by the network device according to collected codeword information and quantization parameter information during a process of decoding the one or more video streams. The network device is a device capable of providing service of acquiring key frames of one or more video streams. As an example, the network device may be a server.

In an embodiment, before the video stream thumbnails generated from the one or more video streams or key frame thumbnails generated from the key frames are set to the scene thumbnail to generate the picture layout stream according to the selection instruction, the method further includes: receiving a chosen instruction of having selected the scene thumbnail; and enlarging the scene thumbnail by a predetermined multiple according to the chosen instruction, and displaying the enlarged scene thumbnail in the AR/VR interface.

In an embodiment, the step of setting video stream thumbnails generated from the one or more video streams or key frame thumbnails generated from the key frames to the scene thumbnail to generate the picture layout stream according to the selection instruction includes: adjusting sizes of the video stream thumbnails or sizes of the key frame thumbnails according to the selection instruction; selecting a type of a virtual television, and rendering the virtual television into the scene thumbnail; and rendering the one or more video streams and the virtual television to the AR/VR interface according to coordinates of the scene thumbnail in the AR/VR interface, and updating the scene thumbnail.

In an embodiment, before the video stream thumbnails generated from the one or more video streams or key frame thumbnails generated from the key frames are set to the scene thumbnail to generate the picture layout stream according to the selection instruction, the method further includes: capturing a virtual box formed by a gesture in a predetermined direction through an AR/VR camera; obtaining coordinates and a size of the virtual box in the AR/VR interface through calculation; and rendering the virtual television indicated by the virtual box in the AR/VR interface.

In an embodiment, the method further includes: receiving a current gaze direction of a user and layout information of a real-time picture which are fed back by the AR/VR camera; and adjusting, according to the layout information, at least one of the following parameters of each of the one or more video streams: resolution, frame rate, or code rate.

An embodiment of the present disclosure proposes a manner of presenting multiple video streams, virtual display devices using the virtual reality or augmented reality technology are used for receiving and displaying one or more video streams, and presentation of multiple video streams with better user experience can be achieved through low-cost AR/VR glasses.

Each terminal in the embodiment of the present disclosure may send one or more video streams, and each terminal may also control each received video stream. A virtual layout interface of multiple video stream pictures is provided, so that the user can operate the multiple video stream pictures in the entire layout interface through handle or gesture control. Since AR/VR has a wide field of view, in order to operate the picture more conveniently, the user can use scene thumbnails to adjust the entire interface layout of multiple video streams in the AR/VR field of view, and also use video stream thumbnails to perform operations such as picture selection, picture switching, and picture backtracking and comparison on the multiple video stream pictures. In addition, a system dynamically adjusts a coding bandwidth of each video stream by tracking a focus of eyes or detecting user events to reduce a transmission bandwidth of the entire system.

The embodiment of the present disclosure provides the system for presenting multiple video streams based on virtual reality or augmented reality, each terminal is allowed to select receiving one or more video streams sent by one or more terminals, multiple video streams can be simultaneously presented, and multiple video streams can be conveniently subjected to layout, switching, backtracking and comparison to improve the usability and immersion of the video presentation system.

Figure 2:
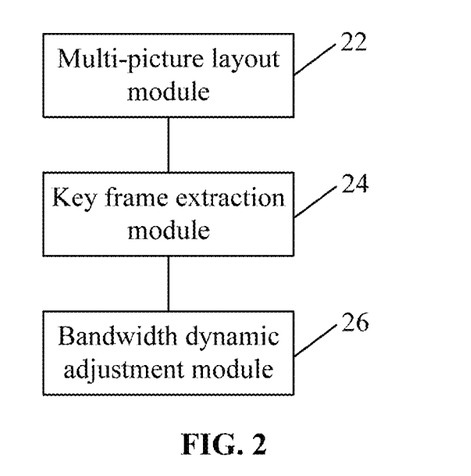
FIG. 2 is a system architecture diagram of video processing according to an embodiment of the present disclosure.

FIG. 2 is a system architecture diagram of video processing according to an embodiment of the present disclosure. As shown in FIG. 2, three functional modules are mainly included: a multi-picture layout module 22, a key frame extraction module 24, and a bandwidth dynamic adjustment module 26.

The multi-picture layout module 22 is configured to generate thumbnails of multiple video stream pictures received by the terminal, or thumbnails of multiple video stream pictures sent by all terminals and acquired from the server, or thumbnails of multiple key frames of one or more video streams. The user selects video streams or key frames that need to be browsed, and puts the selected video streams or key frames that need to be browsed into the scene thumbnail for layout. Finally, the system generates a corresponding picture layout stream in the VR/AR interface according to the scene thumbnail and presents the picture layout stream to the user. The module includes three parts, i.e., video stream thumbnails, key frame thumbnails, and a scene thumbnail. The implementation steps of the video stream thumbnails are: acquiring one or more video streams of each terminal; generating the video stream thumbnails; select video stream pictures from the video stream thumbnails for operation.

The implementation steps of the key frame thumbnails are: acquiring key frames of one or more video streams; generating the key frame thumbnails; selecting key frame pictures from the key frame thumbnails for operation.

The implementation steps of the scene thumbnail are: generating the scene thumbnail based on the current AR/VR interface layout; selecting pictures desired to be displayed from the video stream thumbnails and the key frame thumbnails and place the pictures into the scene thumbnail; detecting and updating the layout of the scene thumbnail; and performing picture display at the corresponding position in the AR/VR interface.

The key frame extraction module 24 is configured to collect information such as codewords and quantization parameters during a decoding process, generate key frames of the current video stream according to the collected information, and save the generated key frames in the corresponding key frame queue.

The bandwidth dynamic adjustment module 26 is configured to track the focus of the user's eyes or consider a current layout position to increase the bandwidth of the video stream that the user is concerned about, increase the resolution, frame rate and other parameters, reduce the bandwidth of the video stream that the user is not concerned about, reduce resolution, frame rate and other parameters, and maximize the user's visual experience while maintaining the overall bandwidth unchanged. The implementation steps of the module are: through the eye tracking function of the AR/VR glasses, tracking the user's current gaze direction and simultaneously detecting whether the user has layout adjustment; and feeding back the eye focus and real-time picture layout to the network device.

The network device adjusts the parameters such as the resolution, frame rate, and bit rate of each video stream according to the layout information fed back by the terminal in real time to reduce the bandwidth of the non-focused picture and increase the bandwidth of the focused picture.

The embodiments of the present disclosure implement a manner of and a system for presenting multiple video streams based on the virtual reality or augmented reality technology. Each terminal can conveniently select the video stream to be browsed, conveniently adjust the video stream picture layout in virtual reality or augmented reality, can also trace back and compare the video stream pictures, and can achieve that each terminal receives one or more video streams sent by one or more terminals without significantly increasing the coding bandwidth.

The key frame extraction module 24 is configured to collect information such as codewords of the MB or largest coding unit (LCU) level and quantization parameters during a process of decoding video frames, generate key frames of the current video stream according to the collected information, and save the generated key frames in the key frame queue.

The multi-picture layout module 22 first generates a scene thumbnail from the entire interface of the AR/VR field of view, then generates video stream thumbnails from received video streams, and generates key frame thumbnails from key frame pictures. The user then puts the video streams and key frames that the user desires to see into the scene thumbnail according to the user's needs and adjusts the layout. Finally, a layout result of the scene thumbnail is displayed at a corresponding position in the entire interface of the AR/VR field of view.

The bandwidth dynamic adjustment module 26 tracks the user's current gaze direction through the eye tracking function of the AR/VR glasses. The system feeds back the result to the network device, and the network device adjusts, according to the feedback result, the frame rate, resolution, and other parameters of the corresponding video streams sent to the terminal to increase or decrease the bandwidth.

Figure 3:
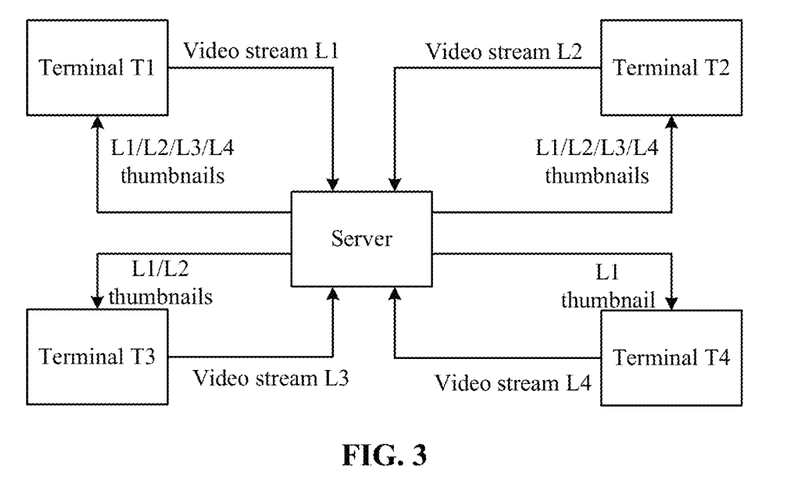
FIG. 3 is a schematic diagram of a terminal freely selecting video streams according to an embodiment of the present disclosure.

FIG. 3 is a schematic diagram of a terminal freely selecting video streams according to an embodiment of the present disclosure. As shown in FIG. 3, a video conference is used as an example, a multipoint conference is held, terminal T1, terminal T2, terminal T3, and terminal T4 participate in the conference, four terminals each send one or more video streams, and four terminals each may freely browse the video streams of other terminals or browse their own video streams, for example, terminal T1 browses video streams of terminal T1, terminal T2, terminal T3, and terminal T4, terminal T2 browses video streams of terminal T1, terminal T2, terminal T3, and terminal T4, terminal T3 browses video streams of terminal T1 and terminal T2, and terminal T4 browse video streams of terminal T1.

Figure 4:
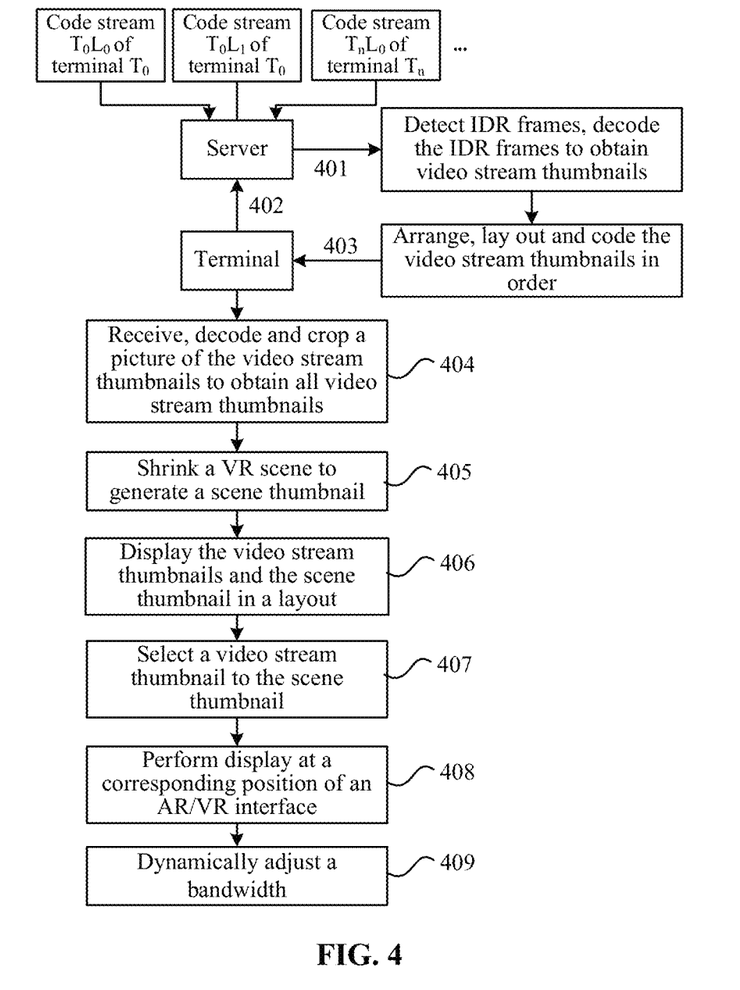
FIG. 4 is a flowchart of acquiring video stream thumbnails of all terminals from a server according to an embodiment of the present disclosure.

FIG. 4 is a flowchart of acquiring video stream thumbnails of all terminals from a server according to an embodiment of the present disclosure, as shown in FIG. 4, and the following steps are included.

In step 401, each terminal joins the conference and sends a video stream to the server, and the server detects whether an instantaneous decoding refresh (IDR) frame exists in a code stream of each video stream. If the current video stream has a new IDR frame, the server decodes the IDR frame and performs shrinking to obtain a thumbnail of the current video stream.

In step 402, the current terminal sends a message to the server for requesting thumbnails of video streams of all terminals from the server.

In step 403, the server arranges and lays out the thumbnails of the video streams of all terminals in a certain order to form a larger thumbnail picture, codes the thumbnail picture and sends the coded thumbnail picture to the terminal.

In step 404, after the current terminal T3 receives and decodes the encoded thumbnail picture to obtain the thumbnail picture, the current terminal T3 crops each sub-picture in the thumbnail picture to obtain the thumbnail corresponding to each video stream.

In step 405, a current scene displayed in the AR/VR glasses is shrunk to generate a scene thumbnail.

In step 406, the thumbnail corresponding to each video stream is displayed in a suitable manner into the layout interface, and the scene thumbnail is simultaneously displayed in the layout interface.

In step 407, the user operates through a handle or a gesture to place the selected video stream thumbnail into the scene thumbnail to indicate that the video stream picture is desired to be viewed and is displayed at the corresponding position.

In step 408, after the user determines a layout of the scene thumbnail, the system will display the corresponding video stream at a position of the AR/VR interface.

In step 409, after the user determines a final multi-picture layout, the system feeds back the information such as a serial number and a desired display position and size of the video stream selected by the user to the server, and the server dynamically adjusts the bandwidth according to the above information and forwards the corresponding code stream to the current terminal.

Figure 5:
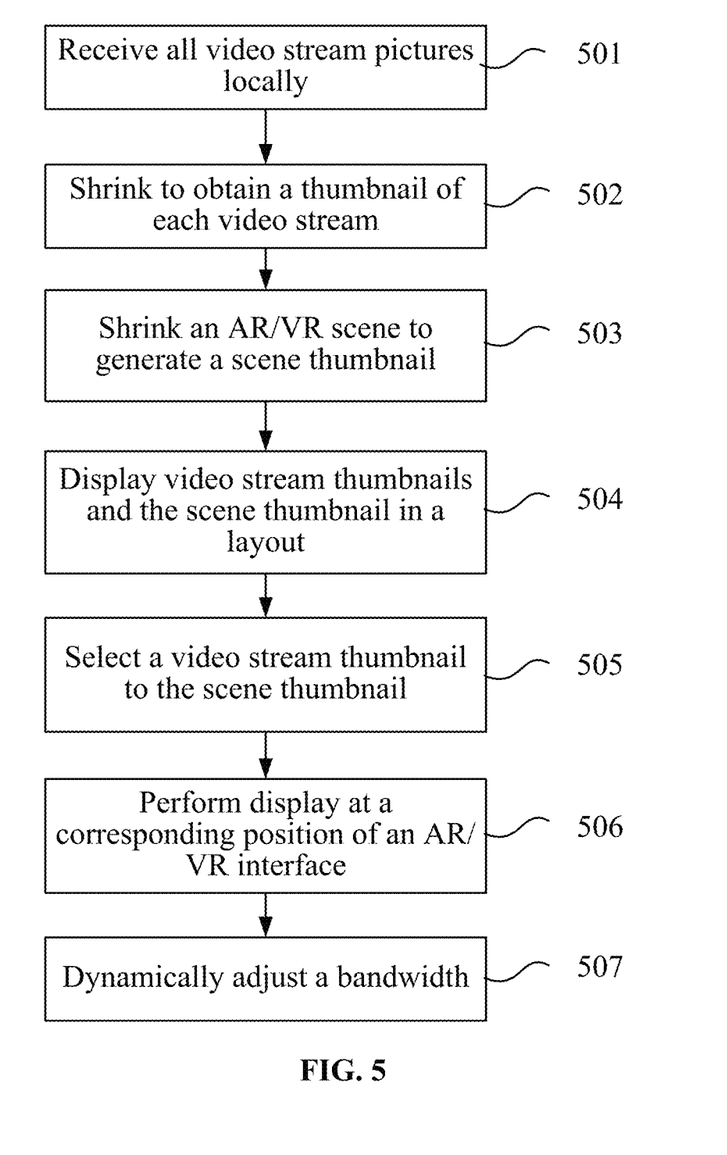
FIG. 5 is a flowchart of locally acquiring currently received video stream thumbnails according to an embodiment of the present disclosure.

FIG. 5 is a flowchart of locally acquiring currently received video stream thumbnails according to an embodiment of the present disclosure, as shown in FIG. 5, and the following steps are included.

In step 501, all video stream pictures are received locally.

In step 502, the system shrinks all the video stream pictures received locally to obtain a thumbnail of each video stream.

In step 503, a current scene displayed in AR/VR glasses is shrunk to generate a scene thumbnail.

In step 504, the thumbnail corresponding to each video stream is displayed in a suitable manner in the layout interface, and the scene thumbnail is simultaneously displayed in the layout interface.

In step 505, the user operates through a handle or a gesture to place the selected video stream thumbnail into the scene thumbnail to indicate that the video stream picture is desired to be viewed and is displayed at the corresponding position.

In step 506, after the user determines a layout of the scene thumbnail, the system will display the corresponding video stream at a position of the AR/VR interface.

In step 507, after the user determines a final multi-picture layout, the system feeds back the information such as a serial number and a desired display position and size of the video stream selected by the user to the server, and the server dynamically adjusts the bandwidth according to the above information and forwards the corresponding code stream to the current terminal.

Figure 6:
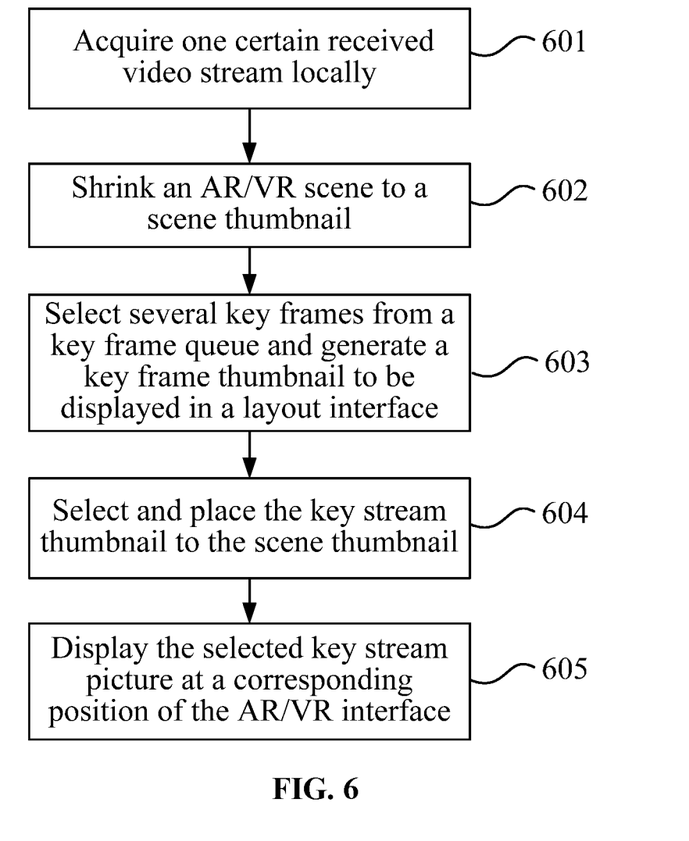
FIG. 6 is a flowchart of locally acquiring key frames of one certain received video stream according to an embodiment of the present disclosure.

FIG. 6 is a flowchart of locally acquiring key frames of one certain received video stream according to an embodiment of the present disclosure, as shown in FIG. 6, and the following steps are included.

In step 601, one certain received video stream is acquired locally.

In step 602, the system shrinks a current scene displayed in AR/VR glasses to generate a scene thumbnail.

In step 603, the system takes the certain number of key frames from a historical key frame queue of the video stream, and generates a thumbnail to be displayed in the layout interface in a suitable manner.

In step 604, the user operates through a handle or a gesture to place the selected key stream thumbnail into the scene thumbnail to indicate that the key stream picture is desired to be viewed and is displayed at the corresponding position.

In step 605, the system displays the selected key stream picture at a corresponding position of the AR/VR interface according to the layout of the key frames set by the user.

Figure 7:
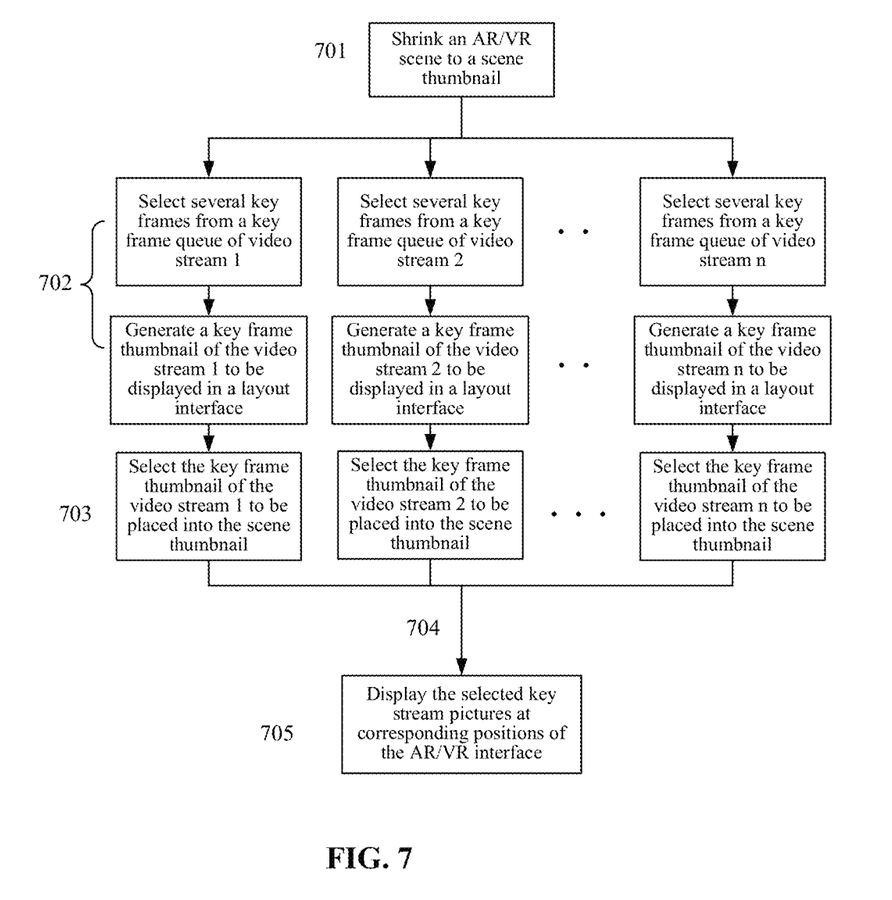
FIG. 7 is a flowchart of locally acquiring key frames of multiple received video streams according to an embodiment of the present disclosure.

FIG. 7 is a flowchart of locally acquiring key frames of multiple received video streams according to an embodiment of the present disclosure, as shown in FIG. 7, and the following steps are included.

In step 701, the system shrinks a current scene displayed in AR/VR glasses to generate a scene thumbnail.

In step 702, the system takes the certain number of key frames from a historical key frame queue of the video stream, and generates a thumbnail to be displayed in the layout interface in a suitable manner, for example, several key frames are selected from a key frame queue of video stream 1, and a key frame thumbnail of video stream 1 is generated to be displayed in the layout interface.

In step 703, the user operates through a handle or a gesture to place the selected key stream thumbnail into the scene thumbnail to indicate that the key frame picture is desired to be viewed and is displayed at the corresponding position.

In step 704, steps 702 to 703 are repeated, and the user places key frame thumbnails of other video streams into the scene thumbnail.

In step 705, the system displays the selected key stream picture at a corresponding position of the AR/VR interface according to the layout of the key frames set by the user.

Figure 8:
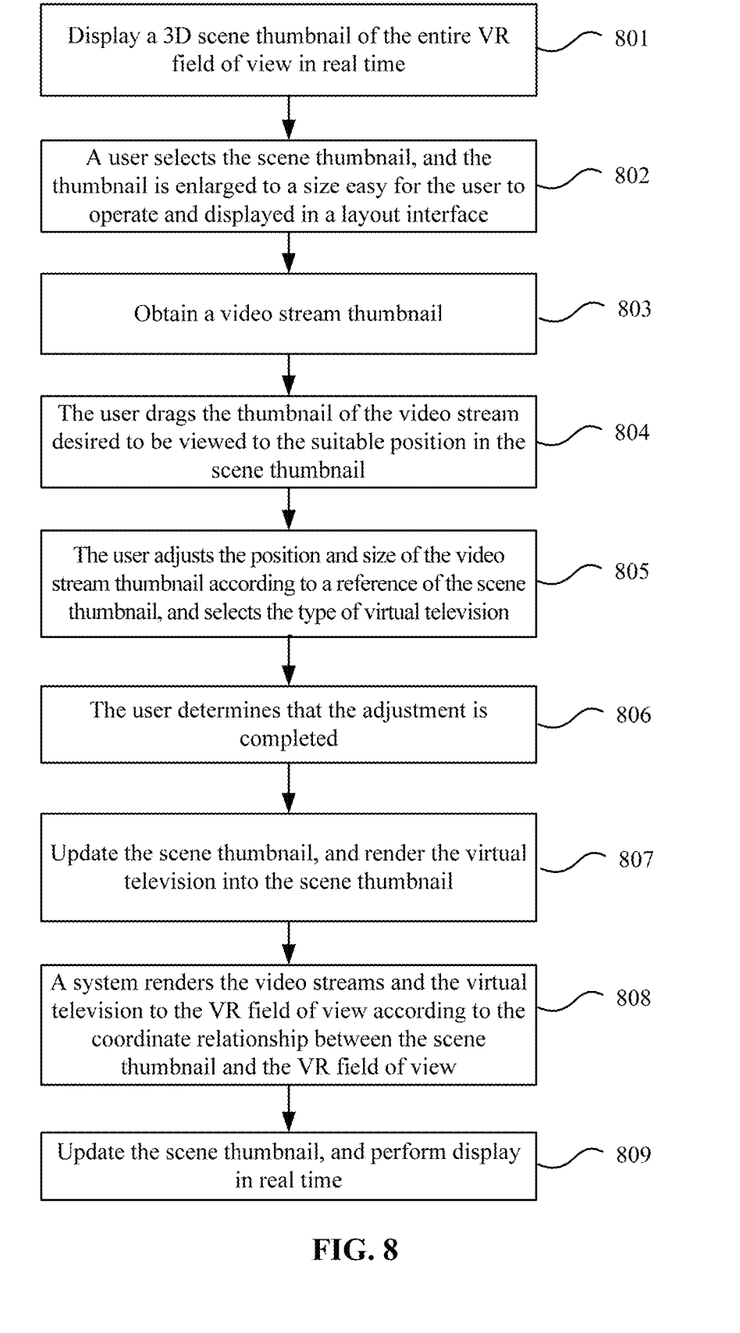
FIG. 8 is a flowchart of a manner of presenting and layout of multiple video streams in virtual reality according to an embodiment of the present disclosure.

FIG. 8 is a flowchart of a manner of presenting and layout of multiple video streams in virtual reality according to an embodiment of the present disclosure, as shown in FIG. 8, and the following steps are included.

In step 801, a three-dimensional (3D) scene thumbnail of the entire VR field of view is displayed in real time at a position directly in front of the user's VR field of view in a certain proportion without affecting the user's line of sight.

In step 802, a user selects the scene thumbnail, and the thumbnail is enlarged to a size easy for the user to operate and displayed in a layout interface.

In step 803, the user obtains a video stream thumbnail according to the method described above.

In step 804, the user drags a thumbnail of a video stream that is desired to be viewed to the suitable position in the scene thumbnail.

Figure 10:
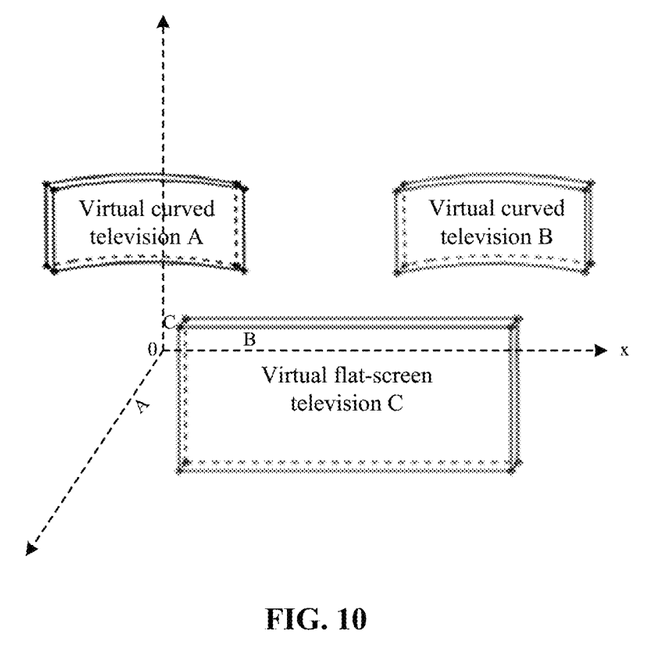
FIG. 10 is a schematic diagram of a virtual television in a virtual reality interface according to an embodiment of the present disclosure.

In step 805, the user adjusts the position and size of the video stream thumbnail according to a reference of the scene thumbnail, and selects the type of virtual television (such as a flat-screen television, a curved television, etc., where FIG. 10 is a legend of a virtual television, including two curved televisions and one flat-screen television) that plays the video stream.

In step 806, steps 803 to 805 are repeated, and the user does not determine that the adjustment is completed until all the video streams that the user desires to view are dragged into the scene thumbnail and subjected to adjustment.

In step 807, the scene thumbnail is updated, and the virtual television is rendered into the scene thumbnail.

In step 808, a system renders the video streams and the virtual television to the VR field of view according to the coordinate relationship between the scene thumbnail and the VR field of view.

In step 809, the scene thumbnail is updated and shrunk, and is displayed in real time at a position that does not affect the user's line of sight.

Figure 9:
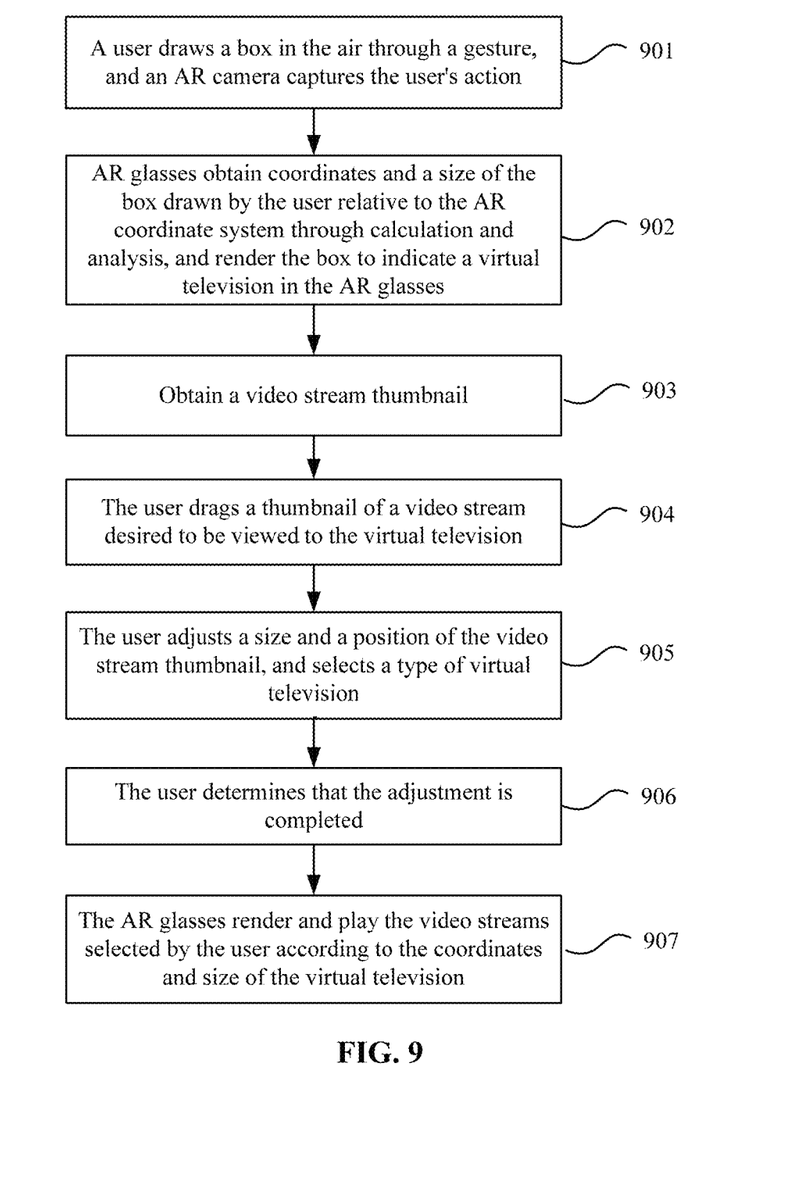
FIG. 9 is a flowchart of a manner of presenting and layout of multiple video streams in augmented reality according to an embodiment of the present disclosure.

FIG. 9 is a flowchart of a manner of presenting and layout of multiple video streams in augmented reality according to an embodiment of the present disclosure, as shown in FIG. 9, and the following steps are included.

In step 901, a user draws a box in the air through a gesture, and a camera of the AR glasses captures the user's action.

In step 902, the AR glasses obtain coordinates and a size of the box drawn by the user relative to the AR coordinate system through calculation and analysis, and render the box to indicate a virtual television in the AR glasses.

In step 903, the user selects a thumbnail of a video stream according to the method described above.

In step 904, the user drags a thumbnail of a video stream that is desired to be viewed to the virtual television.

In step 905, the user adjusts a size and a position of the video stream thumbnail, and selects a type of virtual television (such as a flat-screen television, a curved television, etc., where FIG. 10 is a schematic diagram of a virtual television in a virtual reality interface according to an embodiment of the present disclosure, and as shown in FIG. 10, two curved televisions and one flat-screen television are included).

In step 906, steps 901 to 905 are repeated by the user, and the user does not determine that the adjustment is completed until all the video streams that the user desires to view are adjusted in size and position.

In step 907, the AR glasses render and play the video streams selected by the user according to the coordinates and size of the virtual television.

From the description of the embodiment described above, it will be apparent to those skilled in the art that the methods in the embodiment described above may be implemented by software plus a necessary general-purpose hardware platform, or may of course be implemented by hardware. However, in many cases, the former is a preferred implementation mode. Based on such an understanding, the technical solution of the present disclosure in essence or part that contributes to the existing art may be embodied in the form of a software product which is stored in a storage medium (such as a read-only memory (ROM)/random access memory (RAM), a magnetic disk and a compact disc read-only memory (CD-ROM)) and includes multiple instructions to enable a terminal device (which may be a mobile phone, a computer, a server, a network device, etc.) to perform the methods described in the embodiments of the present disclosure.

Embodiment 2

The embodiment further provides a video processing apparatus configured to implement the above-mentioned embodiments and preferred embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 11:
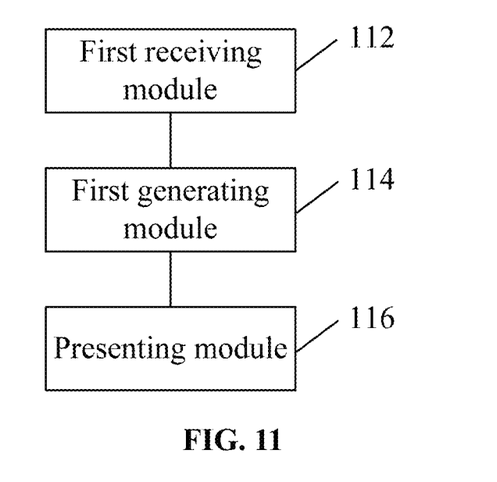
FIG. 11 is a structural block diagram of a video processing apparatus according to an embodiment of the present disclosure.

According to another embodiment of the present disclosure, a video processing apparatus is further provided. FIG. 11 is a structural block diagram of a video processing apparatus according to an embodiment of the present disclosure. As shown in FIG. 11, the apparatus is applied to an AR/VR device, and includes a first receiving module 112, a first generating module 114 and a presenting module 116.

The first receiving module 112 is configured to receive a selection instruction of having selected one or more video streams or key frames of the one or more video streams to be browsed, where the one or more video streams come from one or more terminals.

The first generating module 114 is configured to set video stream thumbnails generated from the one or more video streams or key frame thumbnails generated from the key frames to a scene thumbnail to generate a picture layout stream according to the selection instruction, where the scene thumbnail is generated according to a scene displayed in an AR/VR interface.

The presenting module 116 is configured to present the picture layout stream in the VR/AR interface.

In an embodiment, the apparatus further includes a second generating module and an acquiring module.

The second generating module is configured to generate the video stream thumbnails according to the one or more video streams, where one video stream thumbnail is generated from one video stream.

The acquiring module is configured to acquire the key frames of the one or more video streams, and generate the key frame thumbnails according to the key frames of the one or more video streams, where one key frame thumbnail is generated from key frames of the one video stream.

In an embodiment, the acquiring module is further configured to acquire the key frames of the one or more video streams from a key frame queue preset in a network device, where the key frames of the one or more video streams are key frames generated and saved by the network device according to collected codeword information and quantization parameter information during a process of decoding the one or more video streams.

In an embodiment, the apparatus further includes a second receiving module and an enlarging module.

The second receiving module is configured to receive a chosen instruction of having selected the scene thumbnail.

The enlarging module is configured to enlarge the scene thumbnail by a predetermined multiple according to the chosen instruction, and display the enlarged scene thumbnail in the AR/VR interface.

In an embodiment, the first generating module is further configured to adjust sizes of the video stream thumbnails or sizes of the key frame thumbnails according to the selection instruction; select a type of a virtual television, and render the virtual television into the scene thumbnail; and render the one or more video streams and the virtual television to the AR/VR interface according to coordinates of the scene thumbnail in the AR/VR interface, and update the scene thumbnail.

In an embodiment, the apparatus further includes a capturing module, a calculation module and a rendering module.

The capturing module is configured to capture a virtual box formed by a gesture in a predetermined direction through an AR/VR camera.

The calculation module is configured to obtain coordinates and a size of the virtual box in the AR/VR interface through calculation.

The rendering module is configured to render the virtual television indicated by the virtual box in the AR/VR interface.

In an embodiment, the apparatus further includes a third receiving module and an adjusting module.

The third receiving module is configured to receive a current gaze direction of a user and layout information of a real-time picture which are fed back by the AR/VR camera.

The adjusting module is configured to adjust, according to the layout information, at least one of the following parameters of each of the one or more video streams: resolution, frame rate, or code rate.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 3

An embodiment of the present disclosure further provides a storage medium. The storage medium includes a stored program which, when executed, performs any of above-mentioned methods.

Optionally, in the embodiment, the above storage medium may be configured to store a program code for performing the following steps: receiving a selection instruction of having selected one or more video streams or key frames of the one or more video streams to be browsed, where the one or more video streams come from one or more terminals; setting video stream thumbnails generated from the one or more video streams or key frame thumbnails generated from the key frames to a scene thumbnail to generate a picture layout stream according to the selection instruction, where the scene thumbnail is generated according to a scene displayed in an augmented reality/virtual reality (AR/VR) interface; and presenting the picture layout stream in the VR/AR interface.

Optionally, in the embodiment, the above storage medium may include, but is not limited to, a USB flash drive, a read-only memory (ROM), a random access memory (RAM), a mobile hard disk, a magnetic disk, an optical disk or another medium capable of storing program codes.

Embodiment 4

An embodiment of the present disclosure further provides a processor. The processor is configured to execute programs which, when executed, perform the steps of any method described above.

Optionally, in the embodiment, the above program is used to perform the following steps: receiving a selection instruction of having selected one or more video streams or key frames of the one or more video streams to be browsed, where the one or more video streams come from one or more terminals; setting video stream thumbnails generated from the one or more video streams or key frame thumbnails generated from the key frames to a scene thumbnail to generate a picture layout stream according to the selection instruction, where the scene thumbnail is generated according to a scene displayed in an augmented reality/virtual reality (AR/VR) interface; and presenting the picture layout stream in the VR/AR interface.

Optionally, for specific examples in the embodiment, reference may be made to the examples described in the above-mentioned embodiments and optional embodiments, and repetition will not be made in the embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are merely preferred embodiments of the present disclosure and are not intended to limit the present disclosure. For those skilled in the art, the present disclosure may have various modifications and variations. Any modifications, equivalent substitutions, improvements and the like made within the principle of the present disclosure fall within the scope of the present disclosure.

What is claimed is:

1. A video processing method, comprising:
receiving a selection instruction of having selected one or more video streams or key frames of the one or more video streams to be browsed, wherein the one or more video streams come from one or more terminals;
setting video stream thumbnails generated from the one or more video streams or key frame thumbnails generated from the key frames to a scene thumbnail to generate a picture layout stream according to the selection instruction, wherein the scene thumbnail is generated according to a scene displayed in an augmented reality/virtual reality (AR/VR) interface;
presenting the picture layout stream in the VR/AR interface;
receiving a current gaze direction of a user and layout information of a real-time picture which are fed back by the AR/VR camera; and
adjusting, according to the layout information, at least one of following parameters of each of the one or more video streams: resolution, frame rate, or code rate.

2. The method of claim 1, wherein before the receiving a selection instruction of having selected one or more video streams or key frames of the one or more video streams to be browsed, the method further comprises:
generating the video stream thumbnails according to the one or more video streams, wherein one video stream thumbnail is generated from one video stream; or
acquiring the key frames of the one or more video streams, and generating the key frame thumbnails according to the key frames of the one or more video streams, wherein one key frame thumbnail is generated from key frames of the one video stream.

3. The method of claim 2, wherein the acquiring the key frames of the one or more video streams comprises:
acquiring the key frames of the one or more video streams from a key frame queue preset in a network device, wherein the key frames of the one or more video streams are key frames generated and saved by the network device according to collected codeword information and quantization parameter information during a process of decoding the one or more video streams.

4. The method of claim 1, wherein before the setting video stream thumbnails generated from the one or more video streams or key frame thumbnails generated from the key frames to the scene thumbnail to generate the picture layout stream according to the selection instruction, the method further comprises:
receiving a chosen instruction of having selected the scene thumbnail; and enlarging the scene thumbnail by a predetermined multiple according to the chosen instruction, and displaying the enlarged scene thumbnail in the AR/VR interface.

5. The method of claim 4, wherein the setting video stream thumbnails generated from the one or more video streams or key frame thumbnails generated from the key frames to the scene thumbnail to generate the picture layout stream according to the selection instruction comprises:
adjusting sizes of the video stream thumbnails or sizes of the key frame thumbnails according to the selection instruction;
selecting a type of a virtual television, and rendering the virtual television into the scene thumbnail; and
rendering the one or more video streams and the virtual television to the AR/VR interface according to coordinates of the scene thumbnail in the AR/VR interface, and updating the scene thumbnail.

6. The method of claim 5, wherein before the setting video stream thumbnails generated from the one or more video streams or key frame thumbnails generated from the key frames to the scene thumbnail to generate the picture layout stream according to the selection instruction, the method further comprises:
capturing a virtual box formed by a gesture in a predetermined direction through an AR/VR camera; obtaining coordinates and a size of the virtual box in the AR/VR interface through calculation; and
rendering the virtual television indicated by the virtual box in the AR/VR interface.

7. A video processing apparatus, applied to an augmented reality/virtual reality (AR/VR) device and comprising:
a processor and a memory storing processor-executable instructions which, when executed by the processor, cause the processor to:
receive a selection instruction of having selected one or more video streams or key frames of the one or more video streams to be browsed, wherein the one or more video streams come from one or more terminals;
set video stream thumbnails generated from the one or more video streams or key frame thumbnails generated from the key frames to a scene thumbnail to generate a picture layout stream according to the selection instruction, wherein the scene thumbnail is generated according to a scene displayed in an AR/VR interface;
present the picture layout stream in the VR/AR interface;
receive a current gaze direction of a user and layout information of a real-time picture which are fed back by the AR/VR camera; and
adjust, according to the layout information, at least one of following parameters of each of the one or more video streams: resolution, frame rate, or code rate.

8. The apparatus of claim 7, wherein the processor-executable instructions which, when executed by the processor, further cause the processor to:
generate the video stream thumbnails according to the one or more video streams, wherein one video stream thumbnail is generated from one video stream; or
acquire the key frames of the one or more video streams, and generate the key frame thumbnails according to the key frames of the one or more video streams, wherein one key frame thumbnail is generated from key frames of the one video stream.

9. The apparatus of claim 8, wherein the processor-executable instructions which, when executed by the processor, further cause the processor to acquire the key frames of the one or more video streams from a key frame queue preset in a network device, wherein the key frames of the one or more video streams are key frames generated and saved by the network device according to collected codeword information and quantization parameter information during a process of decoding the one or more video streams.

10. The apparatus of claim 7, wherein the processor-executable instructions which, when executed by the processor, further cause the processor to:
receive a chosen instruction of having selected the scene thumbnail; and
enlarge the scene thumbnail by a predetermined multiple according to the chosen instruction, and display the enlarged scene thumbnail in the AR/VR interface.

11. The apparatus of claim 10, wherein the processor-executable instructions which, when executed by the processor, further cause the processor to adjust sizes of the video stream thumbnails or sizes of the key frame thumbnails according to the selection instruction; select a type of a virtual television, and render the virtual television into the scene thumbnail; and render the one or more video streams and the virtual television to the AR/VR interface according to coordinates of the scene thumbnail in the AR/VR interface, and update the scene thumbnail.

12. The apparatus of claim 11, wherein the processor-executable instructions which, when executed by the processor, further cause the processor to:
capture a virtual box formed by a gesture in a predetermined direction through an AR/VR camera;
obtain coordinates and a size of the virtual box in the AR/VR interface through calculation; and
render the virtual television indicated by the virtual box in the AR/VR interface.

13. A storage medium, comprising stored programs, wherein when executed, the programs perform the method of claim 1.

14. A processor, which is configured to execute programs, wherein when executed, the programs perform the method of claim 1.

* * * * *